(12) United States Patent
Lee et al.

(10) Patent No.: US 8,330,882 B2
(45) Date of Patent: Dec. 11, 2012

(54) IMAGE DISPLAY CAPABLE OF BEING AN ELECTRONIC CURTAIN

(75) Inventors: Johnsee Lee, Hsinchu (TW); Chao-Chiun Liang, Taipei County (TW); Tzeng-Shii Tsai, Hsinchu County (TW)

(73) Assignee: Industrial Technology Research Institute, Chutung, Hsinshu (TW)

( * ) Notice: Subject to any disclaimer, the term of this patent is extended or adjusted under 35 U.S.C. 154(b) by 268 days.

(21) Appl. No.: 12/392,371

(22) Filed: Feb. 25, 2009

(65) Prior Publication Data
US 2010/0214501 A1 Aug. 26, 2010

(51) Int. Cl.
*G02F 1/133* (2006.01)
*G02F 1/1334* (2006.01)
(52) U.S. Cl. ............................................. 349/16; 349/74
(58) Field of Classification Search .................. None
See application file for complete search history.

(56) References Cited

U.S. PATENT DOCUMENTS

| | | | |
|---|---|---|---|
| 5,544 A | 5/1848 | Loomis | |
| 182,666 A | 9/1876 | Heverly | |
| 5,090,145 A | 2/1992 | Chiang et al. | |
| 5,296,952 A * | 3/1994 | Takatsu et al. | 349/77 |
| 5,416,617 A * | 5/1995 | Loiseaux et al. | 349/1 |
| 6,297,900 B1 * | 10/2001 | Tulloch et al. | 359/275 |
| 6,311,441 B1 | 11/2001 | Beavers et al. | |
| 6,377,769 B2 | 4/2002 | Kakimoto | |
| 6,518,944 B1 | 2/2003 | Doane et al. | |
| 6,538,814 B2 * | 3/2003 | Hunter et al. | 359/449 |
| 6,621,541 B1 * | 9/2003 | Choi | 349/113 |
| 6,677,918 B2 | 1/2004 | Yuhara et al. | |
| 6,961,105 B2 * | 11/2005 | Chang et al. | 349/114 |
| 2001/0011664 A1 * | 8/2001 | Meritt | 224/275 |
| 2003/0231268 A1 * | 12/2003 | Chen et al. | 349/113 |
| 2005/0195354 A1 * | 9/2005 | Doane et al. | 349/143 |
| 2006/0232731 A1 * | 10/2006 | Sikharulidze | 349/113 |
| 2007/0146578 A1 * | 6/2007 | Yabuta et al. | 349/96 |
| 2008/0273145 A1 * | 11/2008 | Akiyama | 349/84 |
| 2009/0015740 A1 * | 1/2009 | Sagitov et al. | 349/16 |
| 2009/0023484 A1 * | 1/2009 | Macklin | 455/575.6 |
| 2010/0097549 A1 * | 4/2010 | Ishikawa et al. | 349/115 |

FOREIGN PATENT DOCUMENTS

JP 10-299361 A * 11/1998
WO WO 2008/056842 A1 * 5/2008

* cited by examiner

*Primary Examiner* — Mike Stahl
(74) *Attorney, Agent, or Firm* — Alston & Bird LLP (57) ABSTRACT

An image display comprises at least one display device having a first pair of transparent conductive layers, a second pair of transparent conductive layers spaced apart from the first pair transparent conductive layers, a display layer disposed between the first pair of transparent conductive layers, the display layer configured to display an image in response to a first set of voltages applied to the first pair of transparent conductive layers, and a light control layer disposed between the second pair of transparent conductive layers, the light control layer configured to operate in one of a transmissive mode to allow an incident light to pass toward the display layer and a reflective mode to reflect an incident light away from the display layer in response to a second set of voltages applied to the second pair of transparent conductive layers.

22 Claims, 8 Drawing Sheets

IMAGE DISPLAY CAPABLE OF BEING AN ELECTRONIC CURTAIN

BACKGROUND OF THE INVENTION

The present invention relates generally to a display device and, more particularly, to a display device in the form of a window curtain, shade or the like.

Traditional curtains, if smooth enough, may serve as screens for electronic projecting display devices. The curtain itself, however, may not function to serve as an independent display device. Owing to the electronic integration technology, some display devices have been developed to work as a part of traditional window curtains and display images in a relatively large area. However, unlike the traditional window curtains that can be adjusted to allow outdoor light to come in, these display devices cannot be adjusted to let in outdoor light. Currently there is not a display device in the form of an adjustable window curtain that allow for traditional functions of a window curtain while serving as an image display.

BRIEF SUMMARY OF THE INVENTION

In accordance with an embodiment of the present invention, there is provided an image display that comprises at least one display device. Each of the at least one display device further comprises a first pair of transparent conductive layers, a second pair of transparent conductive layers spaced apart from the first pair transparent conductive layers, a display layer disposed between the first pair of transparent conductive layers, the display layer configured to display an image in response to a first set of voltages applied to the first pair of transparent conductive layers, and a light control layer disposed between the second pair of transparent conductive layers. The light control layer may be configured to operate in one of a transmissive mode to allow an incident light to pass toward the display layer and a reflective mode to reflect an incident light away from the display layer in response to a second set of voltages applied to the second pair of transparent conductive layers.

Also in accordance with an embodiment of the present invention, there is provided an electronic curtain that comprises at least one display device. Each of the at least one display device further comprises a first transparent conductive layer, a second transparent conductive layer spaced apart from the first transparent conductive layer, a third transparent conductive layer spaced apart from the first and second transparent conductive layers, a display layer disposed between the first and second transparent conductive layers, the display layer configured to display an image in response to a first set of voltages applied to the first and second transparent conductive layers, and a light control layer disposed between the second and third transparent conductive layers. The light control layer may be configured to operate in one of a transmissive mode to allow an incident light to pass toward the display layer and a reflective mode to reflect an incident light away from the display layer in response to a second set of voltages applied to the second and third transparent conductive layers.

Still in accordance with another embodiment of the present invention, there is provided an electronic curtain that comprises at least one display device. Each of the at least one display device further comprises a first pair of transparent conductive layers; a second pair of transparent conductive layers spaced apart from the first pair of transparent conductive layers, a first display layer between the first pair of transparent conductive layers, the first display layer configured to display a first image in response to a first set of voltages applied to the first pair of transparent conductive layers, a second display layer disposed between the second pair of transparent conductive layers, the second display layer configured to display a second image in response to a second set of voltages applied to the second pair of transparent conductive layers, and a light control layer disposed between the first and second display layers. The light control layer may be configured to operate in a reflective mode to reflect a first incident light toward the first display layer and a second incident light toward the second display layer.

Additional features and advantages of embodiments of the present invention will be set forth in part in the description which follows, and in part will be obvious from the description, or may be learned by practice of embodiments of the invention. The features and advantages of the invention will be realized and attained by means of the elements and combinations particularly pointed out in the appended claims.

It is to be understood that both the foregoing general description and the following detailed description are exemplary and explanatory only and are not restrictive of embodiments of the invention, as claimed.

BRIEF DESCRIPTION OF THE SEVERAL VIEWS OF THE DRAWINGS

The foregoing summary, as well as the following detailed description of some embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the present embodiments of the invention, embodiments of which are illustrated in the accompanying drawings. Wherever possible, the same reference numbers will be used throughout the drawings to refer to the same or like portions.

Figure 1A:
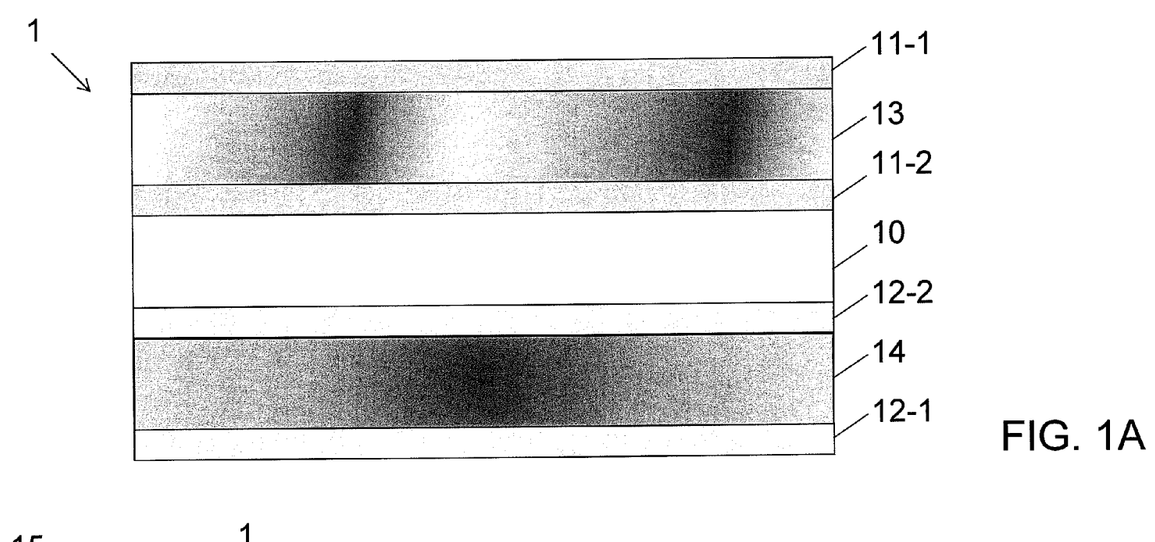
FIG. 1A is a cross-sectional diagram of a display device in accordance with an embodiment of the present invention.

FIG. 1A is a cross-sectional diagram of a display device 1 in accordance with an embodiment of the present invention. Referring to FIG. 1A, the display device 1 may include a first pair of transparent conductive layers 11-1 and 11-2 and a second pair of transparent conductive layers 12-1 and 12-2 spaced apart from the first pair of transparent conductive layers 11-1 and 11-2. The display device 1 also includes a substrate 10 disposed between the transparent conductive layers 11-2 and 12-2, a display layer 13 disposed between the first pair of transparent conductive layers 11-1 and 11-2, and a light control layer 14 disposed between the second pair of transparent conductive layers 12-1 and 12-2.

In one embodiment, the substrate 10 may include one of polyethylene terephtalate (PET), polyethersulphone (PES), polyethylene naphthalate (PEN) and polyimide (PI). The substrate 10 may have a thickness ranging from approximately 50 to 500 micrometers (μm) but the range may vary according to applications. The transparent conductive layers 11-1, 11-2, 12-1 and 12-2 may include one of indium tin oxide (ITO), indium zinc oxide (IZO) and poly(3,4-ethylenedioxythiophene) (PEDOT). Furthermore, the transparent conductive layers 11-1, 11-2, 12-1 and 12-2 may have a thickness ranging from approximately 0.1 to 2 μm but the range may vary according to applications. The display layer 13 may include a bi-stable display device, which includes but is not limited to one of a cholesteric liquid crystal display (CHLCD) layer, an electrophoretic display (EPD) layer and an electrowetting display (EWD) layer. The light control layer 14 may include polymer-dispersed liquid crystal (PDLC) or another material that may be able to change the transmission of light incident to the light control layer 14.

Figure 1B:
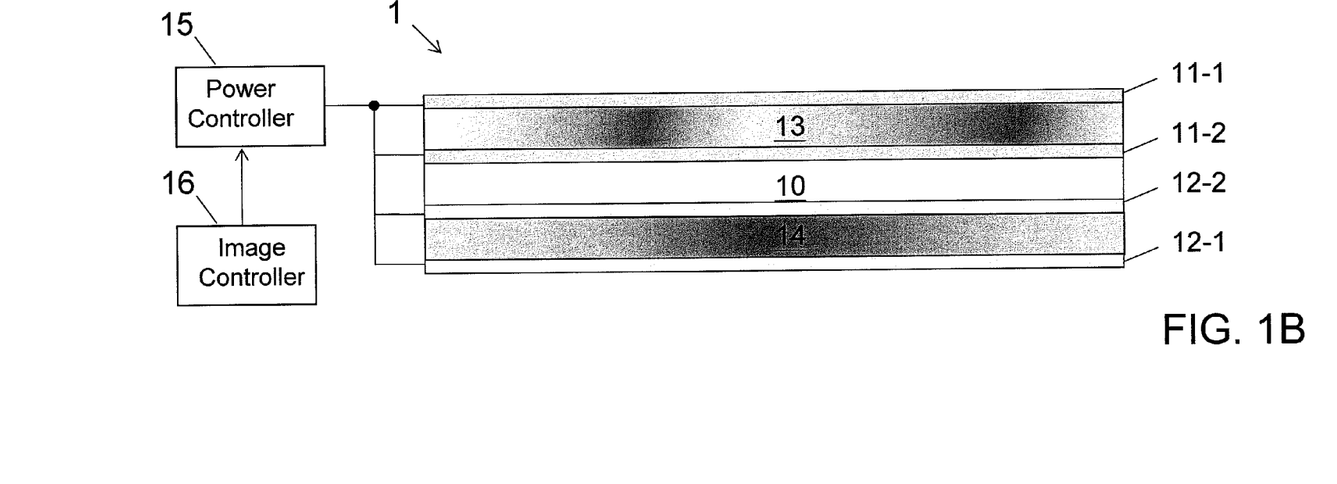
FIG. 1B is a schematic diagram of a system including the display device illustrated in FIG. 1A.

FIG. 1B is a schematic diagram of a system including the display device 1 illustrated in FIG. 1A. Referring to FIG. 1B, the transparent conductive layers 11-1, 11-2, 12-1 and 12-2 may be electrically coupled to a power controller 15, and the display layer 13 may be coupled to an image controller 16 through the power controller 15. The first pair of transparent conductive layers 11-1 and 11-2 may serve as a first pair of electrodes for the display layer 13.

In operation, a first electric field may be established between the first pair of electrodes (e.g., the first pair of transparent conductive layers 11-1 and 11-2) by applying suitable voltage levels thereto. In one embodiment, the first electric field may be established by creating a potential difference of approximately 10 to 200 volts between the first pair of electrodes (e.g., the first pair of transparent conductive layers 11-1 and 11-2). The first electric field may be used to drive the display layer 13.

The display layer 13 may include a number of pixels, which may be addressed by the first pair of transparent conductive layers 11-1 and 11-2. Furthermore, the display layer 13 may exhibit bi-stable characteristics and thus pixels in the display layer 13 may have two stable states. In some embodiments that the display layer 13 may include a CHLCD, when a voltage of approximately 40V is applied, pixels in the display layer 13 may exhibit a relatively high reflectance state (a planar configuration state or so-called a "P" state) having a normalized reflectance level of approximately 100%. When a voltage of approximately 20V is applied, pixels may exhibit a relatively low reflectance state (a focal conic configuration state or so-called an "F" state) having a normalized reflectance level of approximately 5%. In one embodiment, the transparent conductive layer 11-1 may include first conductive lines extending in a first direction and the transparent conductive layer 11-2 may include second conductive lines extending in a second direction substantially orthogonal to the first direction. Furthermore, each of the pixels may be disposed within an intersection of the first and second conductive lines. In another embodiment, the transparent conductive layer 11-1 may include a planar electrode and the transparent conductive layer 11-2 may include dotted electrodes. Moreover, the pixels may include R, G and B subpixels, which may be disposed at a same pixel plane or alternatively in a layered structure.

The second pair of transparent conductive layers 12-1 and 12-2 may serve as a second pair of electrodes for the light control layer 14. In operation, a second electric field may be established between the second pair of electrodes (e.g., the second pair of transparent conductive layers 12-1 and 12-2) by applying suitable voltage levels thereto. For example, the second electric field may be established by creating a potential difference of several volts to several tens of volts between the second pair of electrodes (e.g., the second pair of transparent conductive layers 12-1 and 12-2). The second electric field may be used to change the state of the light control layer 14, which in turn may allow an incident light to pass through or reflect the incident light. Accordingly, by applying suitable voltages to the transparent conductive layers 11-1, 11-2, 12-1 and 12-2 through the power controller 15, an image from the image controller 16 may be displayed.

Figure 2A:
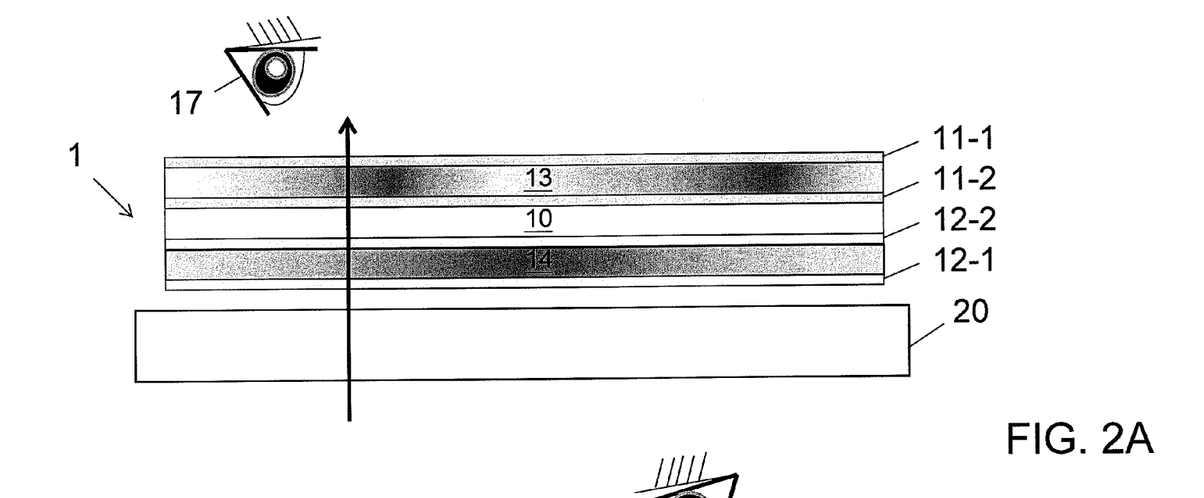
FIGS. 2A and 2B are schematic diagrams illustrating operation modes of the display device illustrated in FIG. 1A.
Figure 2B:
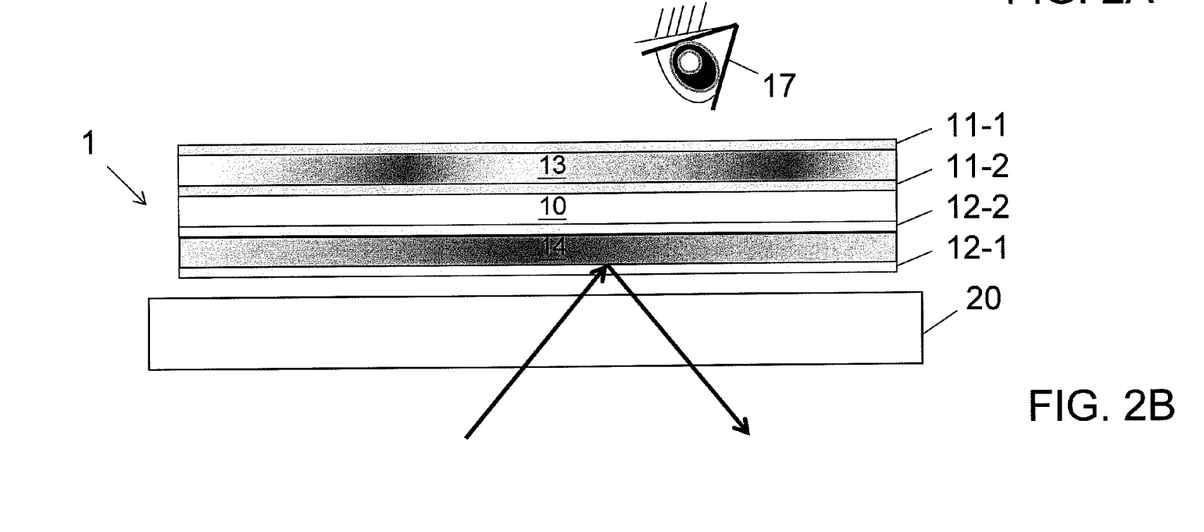

FIGS. 2A and 2B are schematic diagrams illustrating operation modes of the display device 1 illustrated in FIG. 1A. Referring to FIG. 2A, by applying suitable voltages to the second pair of transparent conductive layers 12-1 and 12-2, the light control layer 14 may exhibit a transmissive type characteristic, which allows an incident light from a window 20 to pass through the light control layer 14. The incident light may serve as a backlight source for the display device 1.

Referring to FIG. 2B, by changing the applied voltage levels, for example, removing the voltage source, the light control layer 14 may exhibit a reflective or scattering type characteristic, which reflects or scatters an incident light and thus substantially no light may pass the light control layer 14.

Figure 3A:
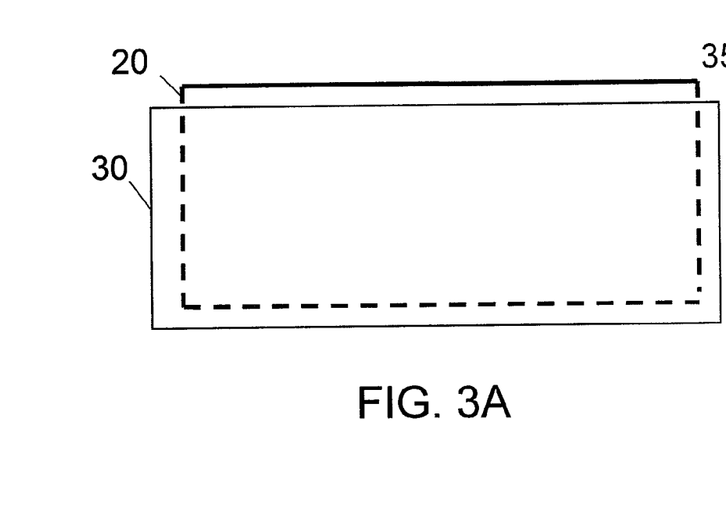
FIGS. 3A to 3C are schematic diagrams of display devices in accordance with other embodiments of the present invention.
Figure 3B:
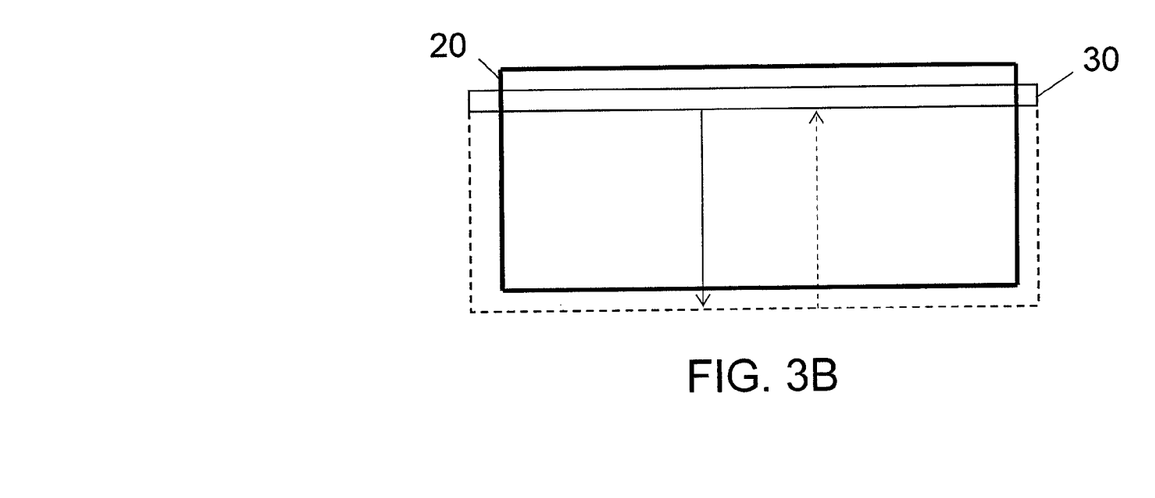
Figure 3C:
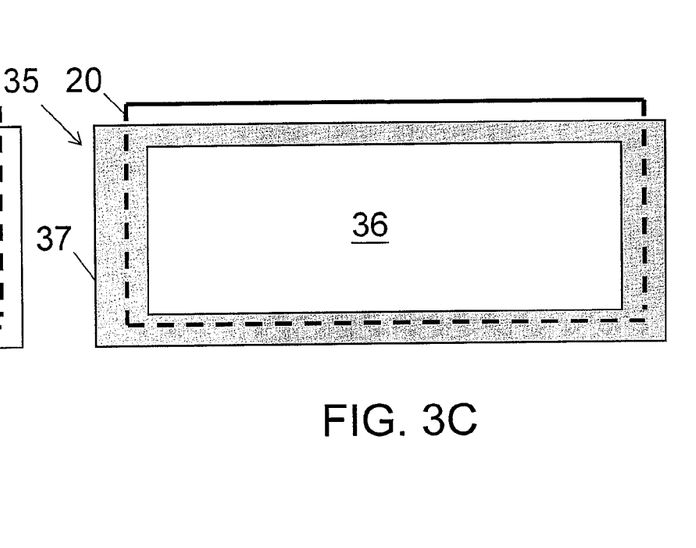

FIGS. 3A to 3C are schematic diagrams of display devices in accordance with other embodiments of the present invention. Referring to FIG. 3A, a display device 30, which may be similar to the display device 1 described and illustrated with reference to FIG. 1A, may take the form of a curtain, which may be arranged near the window 20. Specifically, the display device 30 may function to serve as a curtain to block exterior light at the window 20 from entering a room when the light control layer 14 operates in the reflective mode. Alternatively, the display device 30 may serve as an image display when the light control layer 14 operates in the transmissive mode.

Referring to FIG. 3B, the display device 30 may be flexible and, like Roman shades, may be lifted to a folded position as illustrated and drawn to an unfolded position (shown in dashed lines).

Referring to FIG. 3C, a display device 35 may include a first portion 36 and a second portion 37. The first portion 36, which may serve as an image display, may be similar to the display device 30 described and illustrated with reference to FIG. 3A. The second portion 37, which may not include display elements such as pixels, may serve as a portion of a curtain. For example, the second portion 37 may be made of fabrics.

Figure 4A:
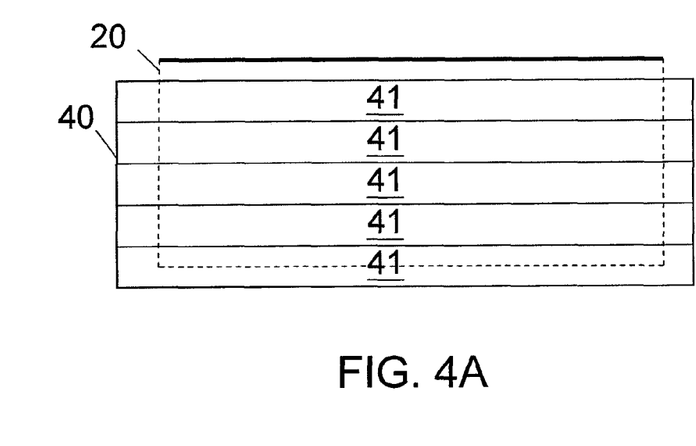
FIGS. 4A and 4B are schematic diagrams of display devices in accordance with still other embodiments of the present invention.
Figure 4B:
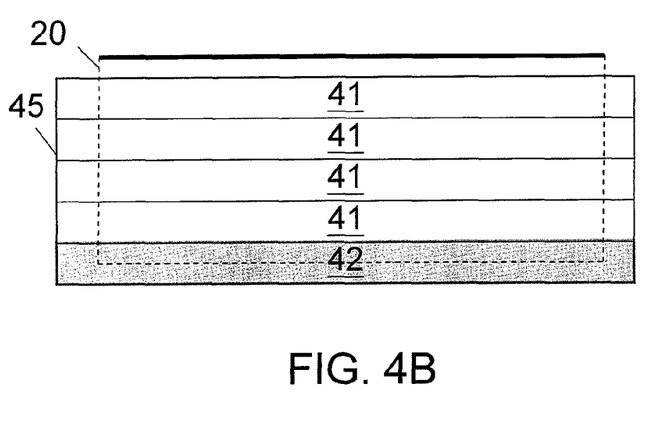

FIGS. 4A and 4B are schematic diagrams of display devices 40 and 45 in accordance with still other embodiments of the present invention. Referring to FIG. 4A, the display device 40 may include a number of display portions 41 extending in a horizontal direction. Each of the display portions 41 may be similar to the display device 1 described and illustrated with reference to FIG. 1A.

Referring to FIG. 4B, the display device 45 may be similar to the display device 40 described and illustrated with reference to FIG. 4A except that the display device 45 includes, for example, at least one non-display portion 42, which may be made of fabrics.

Figure 5A:
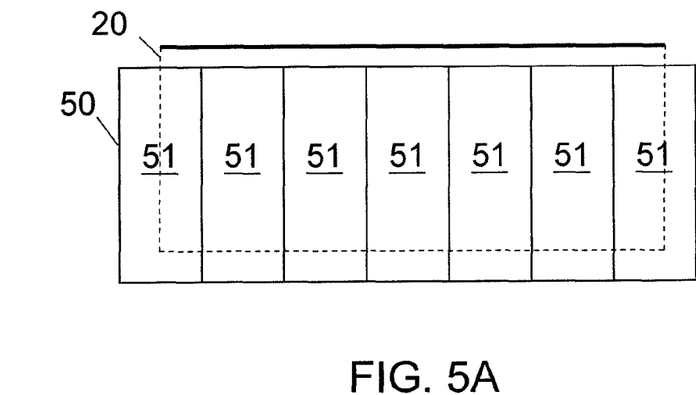
FIGS. 5A and 5B are schematic diagrams of display devices in accordance with yet other embodiments of the present invention.
Figure 5B:
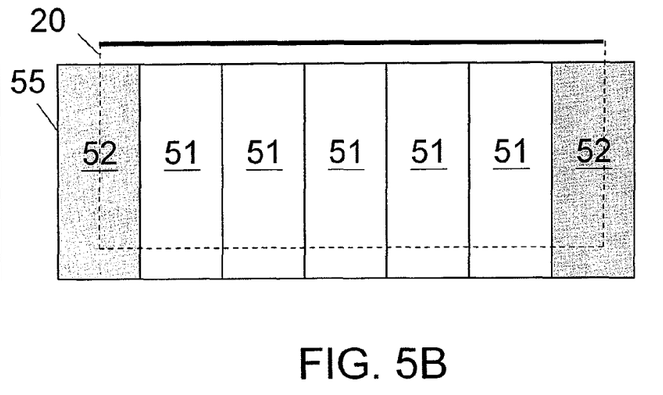

FIGS. 5A and 5B are schematic diagrams of display devices 50 and 55 in accordance with yet other embodiments of the present invention. Referring to FIG. 5A, the display device 50 may be similar to the display device 40 described and illustrated with reference to FIG. 4A except that the display device 50 includes, for example, a number of display portions 51 extending in a vertical direction.

Referring to FIG. 5B, the display device 55 may be similar to the display device 50 described and illustrated with reference to FIG. 5A except that the display device 55 includes, for example, at least one non-display portion 52, which may be made of fabrics.

Figure 6:
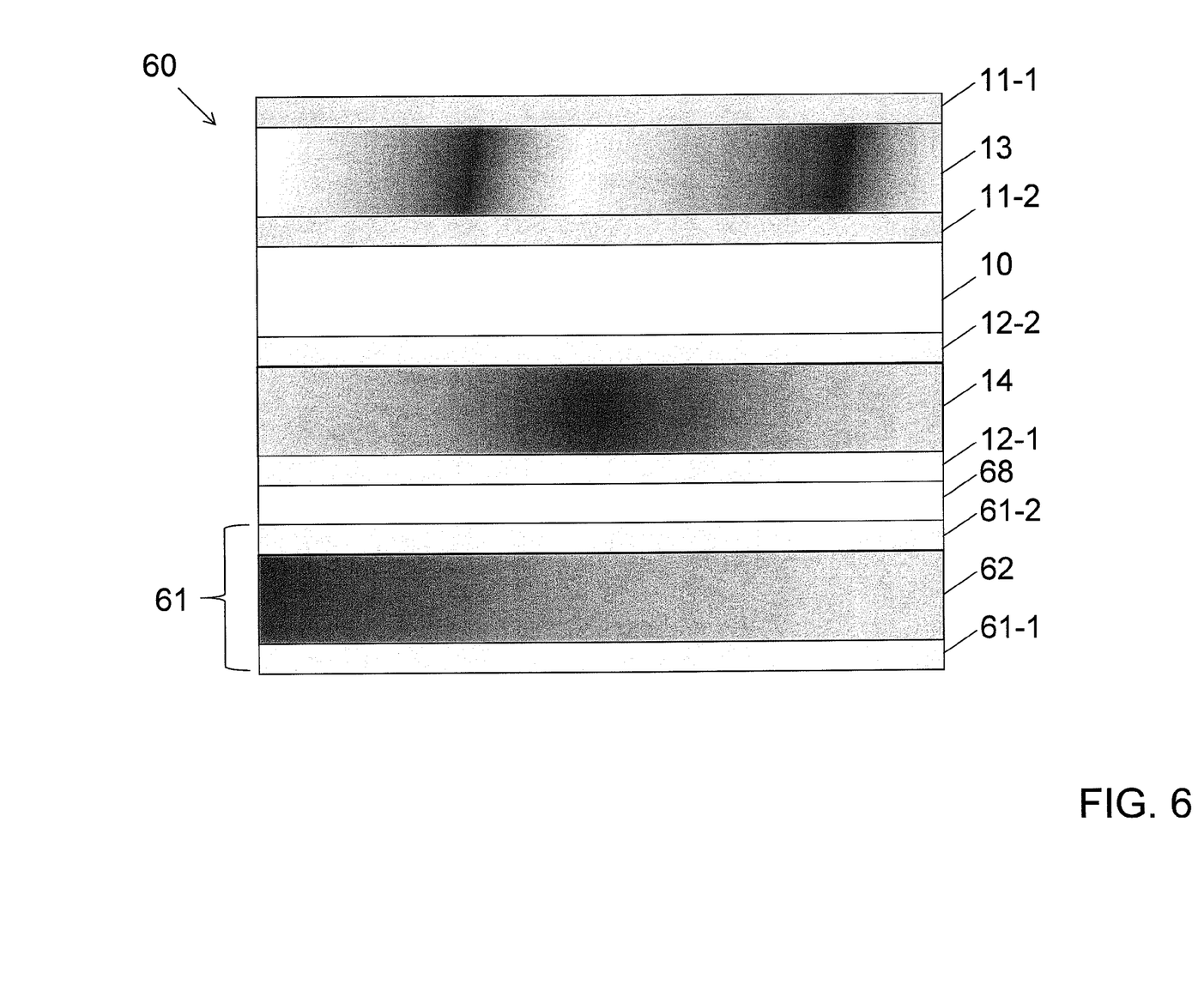
FIG. 6 is a cross-sectional diagram of a display device in accordance with still another embodiment of the present invention.

FIG. 6 is a cross-sectional diagram of a display device 60 in accordance with still another embodiment of the present invention. Referring to FIG. 6, the display device 60 may be similar to the display device 1 described and illustrated with reference to FIG. 1A except that, for example, a solar cell 61 may be added. The solar cell 61 may include a pair of transparent conductive layers 61-1 and 61-2, and a solar film 62 disposed between the pair of transparent conductive layers 61-1 and 61-2. The display device 60 may further include an insulating layer 68 to electrically isolate the transparent conductive layers 61-2 and 12-1. The transparent conductive layers 61-1 and 61-2 may serve as a pair of electrodes for the solar film 62. When driven by the pair of transparent conductive layers 61-1 and 61-2 acting as a pair of electrodes, the solar film 62 may convert solar or light energy into electrical energy. In one embodiment, the solar film 62 may include synthesized dyes.

Figure 7A:
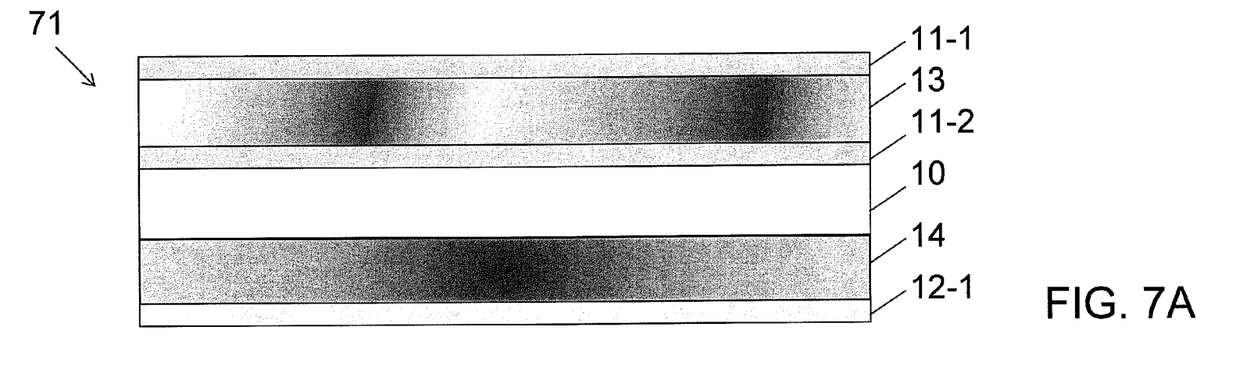
FIGS. 7A and 7B are cross-sectional diagrams of display devices in accordance with yet still other embodiments of the present invention.
Figure 7B:
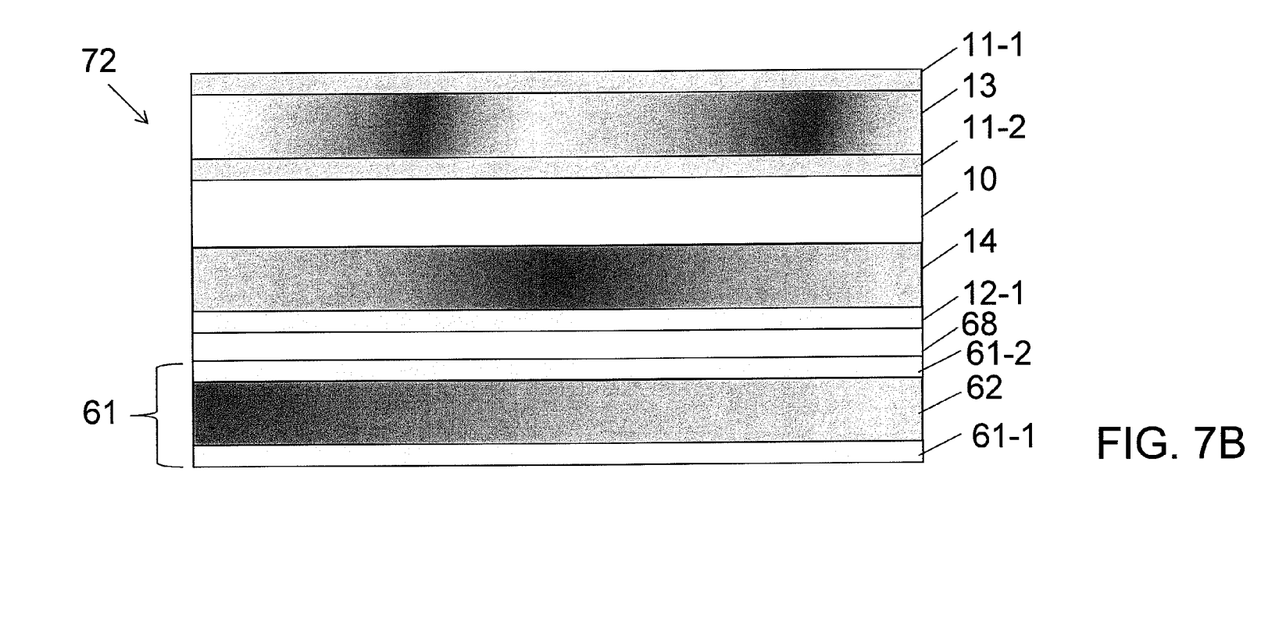

FIGS. 7A and 7B are cross-sectional diagrams of display devices 71 and 72, respectively, in accordance with yet still other embodiments of the present invention. Referring to FIG. 7, the display device 71 may be similar to the display device 1 described and illustrated with reference to FIG. 1A except that, for example, the transparent conductive layer 12-2 may be eliminated. The light control layer 14 in the present embodiment may be driven by the transparent conductive layers 12-1 and 11-2. That is, the transparent conductive layer 11-2, when operated in conjunction with the transparent conductive layer 11-1, may create a first electric field for the display layer 13, while, when operated in conjunction with the transparent conductive layer 12-1, may create a second electric field for the light control layer 14.

Referring to FIG. 7B, the display device 72 may be similar to the display device 71 described and illustrated with reference to FIG. 7A except that, for example, the solar cell 61 may be added. Furthermore, to ensure electrical isolation, the insulating layer 68 may be disposed between the transparent conductive layers 61-2 and 12-1.

Figure 8A:
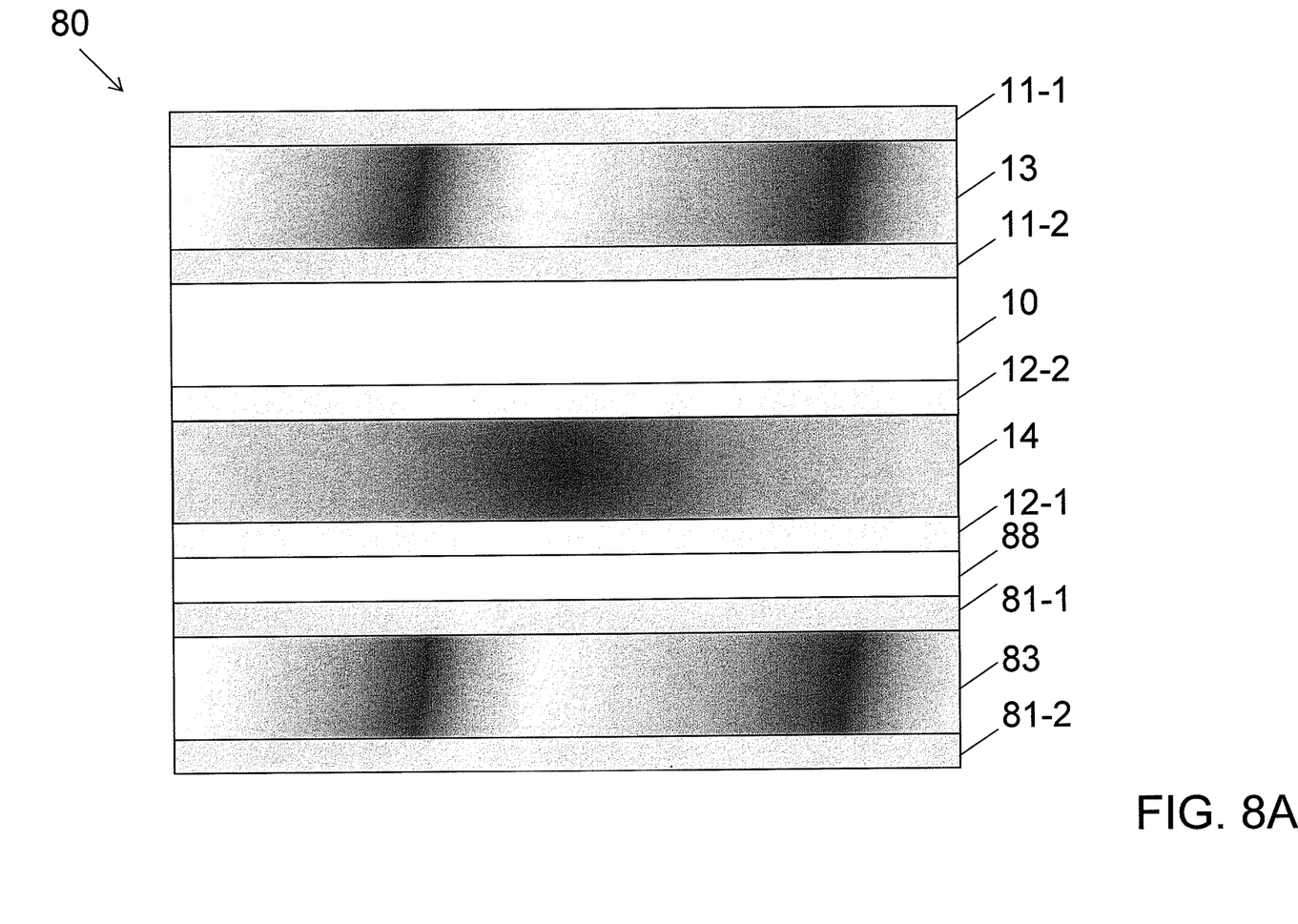
FIG. 8A is a cross-sectional diagram of a display device in accordance with still another embodiment of the present invention.

FIG. 8A is a cross-sectional diagram of a display device 80 in accordance with still another embodiment of the present invention. Referring to FIG. 8A, the display device 80 may be similar to the display device 1 described and illustrated with reference to FIG. 1A except that, for example, an additional display layer 83 associated with a pair of transparent conductive layers 81-1 and 81-2 may be added. The additional display layer 83 and the pair of transparent conductive layers 81-1 and 81-2 may be similar to the display layer 13 and the pair of transparent conductive layers 11-1 and 11-2 described and illustrated with reference to FIG. 1A. In one embodiment, as previously discussed with respect to FIG. 7A, the transparent conductive layer 12-2 may be eliminated. The display device 80 may further include an insulating layer 88 to electrically isolate the transparent conductive layers 81-1 and 12-1.

Figure 8B:
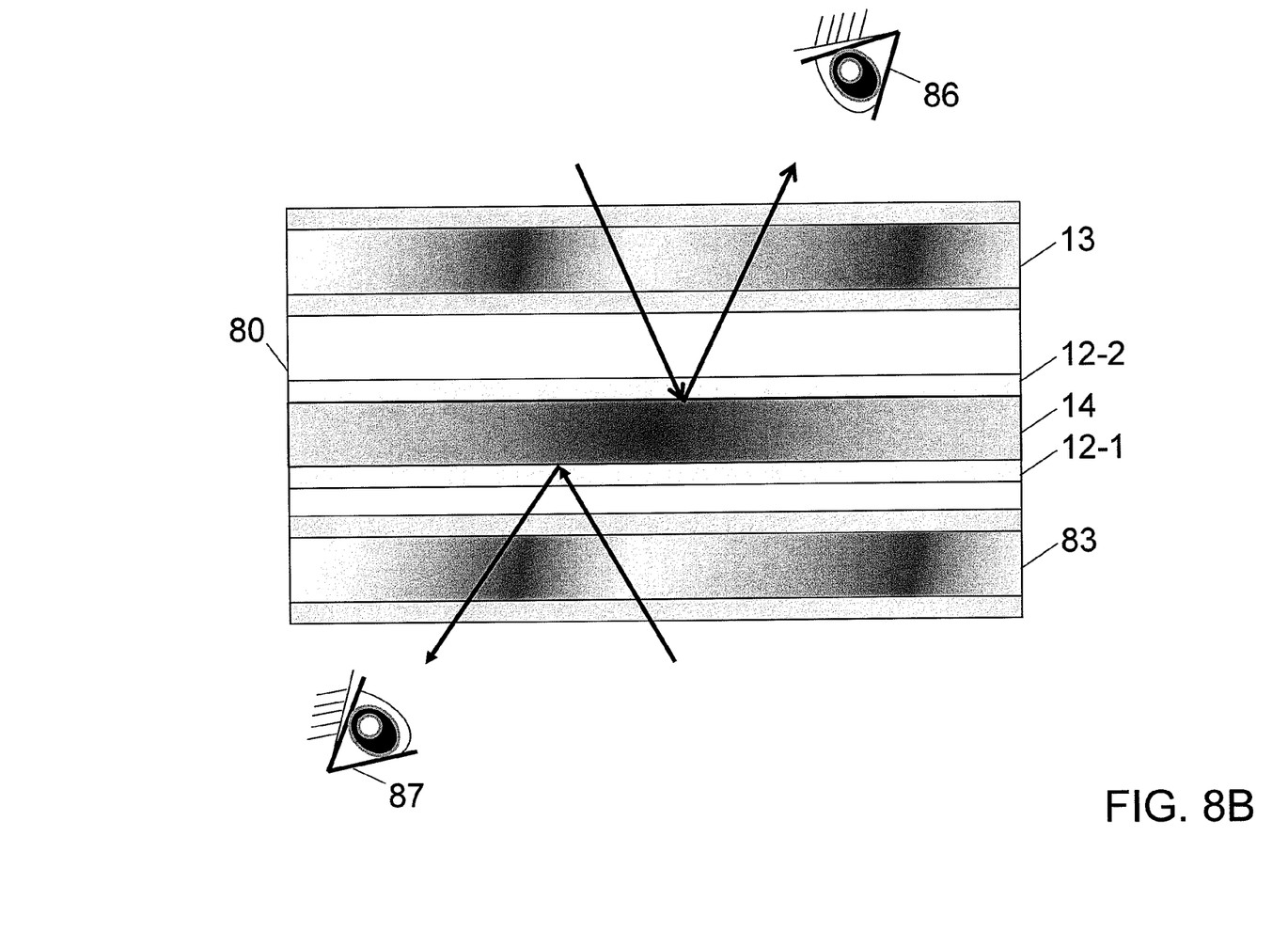
FIG. 8B is a schematic diagram illustrating an operation mode of the display device illustrated in FIG. 8A.

FIG. 8B is a schematic diagram illustrating an operation mode of the display device 80 illustrated in FIG. 8A. Referring to FIG. 8B, the light control layer 14 may be driven to operate at the reflective or scattering mode. In one embodiment, the display layer 13 and the additional display layer 83 may be individually driven and may be coupled to different image sources. Accordingly, a first viewer 86 may view a first image from the display layer 13 while a second viewer 87 may view a second image from the additional display layer 83. Light source for the display device 80 may include ambient light such as fluorescent light for an indoor viewer or sunlight for an outdoor viewer.

Although the foregoing applications of the embodiments of the present invention are described in conjunction with curtains, the embodiments of the present invention may be equally applicable in any application where a flexible display is required and, at the same time, the flexible display is able to be adjusted to block or transmit outdoor or ambient light. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An image display, comprising:
at least one display device, each of the at least one display device further comprising:
a first pair of transparent conductive layers;
a second transparent conductive layer spaced apart from the first pair of transparent conductive layers;
a display layer disposed between the first pair of transparent conductive layers, the display layer configured to display an image in response to a first set of voltages applied to the first pair of transparent conductive layers; and
a light control layer disposed between one of the first pair of transparent conductive layers and the second transparent conductive layer,
wherein the display layer is disposed between a viewer and the light control layer, and the light control layer is disposed between a light source and the display layer, the image displayed by the display layer being viewable by the viewer, and the light source being configured to produce an incident light, and
wherein the light control layer comprises a polymer-dispersed liquid crystal and is configured to selectively operate in a transmissive mode to allow the incident light to pass through the light control layer toward the display layer, or a reflective mode to reflect the incident light to thereby substantially prevent the incident light from passing through the light control layer toward the display layer, in response to a second set of voltages applied to the one of the first pair of transparent conductive layers and the second transparent conductive layer.

2. The image display of claim 1 further comprising:
a third pair of transparent conductive layers spaced apart from the first pair of transparent conductive layers and the second transparent conductive layer; and a solar film disposed between the third pair of transparent conductive layers.

3. The image display of claim 1 further comprising:
a third pair of transparent conductive layers spaced apart from the first pair of transparent conductive layers and the second transparent conductive layer; and
an additional display layer between the third pair of transparent conductive layers, the additional display layer configured to display an additional image in response to a third set of voltages applied to the third pair of transparent conductive layers.

4. The image display of claim 1, wherein the at least one display device includes a number of display portions extending in a horizontal direction.

5. The image display of claim 1, wherein the at least one display device includes a number of display portions extending in a vertical direction.

6. The image display of claim 1, wherein the display layer includes a cholesteric liquid crystal display layer, an electrophoretic display layer or an electro-wetting display layer.

7. The image display of claim 1, wherein the first pair of transparent conductive layers or the second transparent conductive layer includes indium tin oxide (ITO), indium zinc oxide (IZO) or poly(3,4-ethylenedioxythiophene) (PEDOT).

8. The image display of claim 1, wherein the at least one display device is flexible and capable of being folded.

9. An electronic curtain comprising:
a first portion having at least one display device, each of the at least one display device further comprising:
a first transparent conductive layer;
a second transparent conductive layer spaced apart from the first transparent conductive layer;
a third transparent conductive layer spaced apart from the first and second transparent conductive layers;
a display layer disposed between the first and second transparent conductive layers, the display layer configured to display an image in response to a first set of voltages applied to the first and second transparent conductive layers; and
a light control layer disposed between the second and third transparent conductive layers,
wherein the display layer is disposed between a viewer and the light control layer, and the light control layer is disposed between a light source and the display layer, the image displayed by the display layer being viewable by the viewer, and the light source being configured to produce an incident light, and
wherein the light control layer is configured to selectively operate in a transmissive mode to allow the incident light to pass through the light control layer toward the display layer, or a reflective mode to reflect the incident light to thereby substantially prevent the incident light from passing through the light control layer toward the display layer, in response to a second set of voltages applied to the second and third transparent conductive layers; and
a second portion made of fabrics.

10. The electronic curtain of claim 9 further comprising:
a pair of transparent conductive layers spaced apart from the first, second and third transparent conductive layers; and
a solar film disposed between the pair of transparent conductive layers.

11. The electronic curtain of claim 9 further comprising:
a pair of transparent conductive layers spaced apart from the first, second and third transparent conductive layers; and
an additional display layer disposed between the pair of transparent conductive layers, the additional display layer configured to display an additional image in response to a third set of voltages applied to the pair of transparent conductive layers.

12. The electronic curtain of claim 9, wherein the at least one display device includes a number of display portions extending in a horizontal direction.

13. The electronic curtain of claim 9, wherein the at least one display device includes a number of display portions extending in a vertical direction.

14. The electronic curtain of claim 9, wherein the display layer includes a cholesteric liquid crystal display layer, an electrophoretic display layer or an electro-wetting display layer.

15. The electronic curtain of claim 9, wherein the first transparent conductive layer, second transparent conductive layer or third transparent conductive layer includes indium tin oxide (ITO), indium zinc oxide (IZO) or poly(3,4-ethylenedioxythiophene) (PEDOT).

16. An electronic curtain comprising:
at least one display device, each of the at least one display device further comprising:
a first pair of transparent conductive layers;
a second pair of transparent conductive layers spaced apart from the first pair of transparent conductive layers;
a third transparent conductive layer;
a first display layer disposed between the first pair of transparent conductive layers, the first display layer configured to display a first image in response to a first set of voltages applied to the first pair of transparent conductive layers;
a second display layer disposed between the second pair of transparent conductive layers, the second display layer configured to display a second image in response to a second set of voltages applied to the second pair of transparent conductive layers; and
a light control layer disposed between one of the first pair of transparent conductive layers and the third transparent conductive layer,
wherein the first display layer is disposed between a first viewer and the light control layer, and the second display layer is disposed between a second viewer and the light control layer, wherein the first image displayed by the first display layer is viewable by the first viewer, and the second image displayed by the second display layer is viewable by the second viewer, and
wherein the light control layer is configured to selectively operate in a reflective mode to reflect a first incident light toward the first display layer and a second incident light toward the second display layer, or a transmissive mode to allow the first and second incident light to pass through the light control layer, and the first and second display layers, in response to a third set of voltages applied to the one of the first pair of transparent conductive layers and the third transparent conductive layer.

17. The electronic curtain of claim 16, wherein the at least one display device includes a number of display portions extending in a horizontal direction.

18. The electronic curtain of claim 16, wherein the at least one display device includes a number of display portions extending in a vertical direction.

19. The electronic curtain of claim 16 further comprising a portion made of fabrics.

20. The image display of claim 1, wherein the at least one display device comprises only one substrate disposed between the one of the first pair of transparent conductive layers and the light control layer.

21. The image display of claim 16, wherein the at least one display device comprises only one substrate, the only one substrate disposed between the one of the first pair of transparent conductive layers and the light control layer.

22. The image display of claim 16, wherein the at least one display device comprises an insulating layer, the insulating layer disposed between one of the second pair of transparent conductive layers and the third transparent conductive layer.

* * * * *